United States Patent [19]

Sniadower

[11] Patent Number: 5,013,118

[45] Date of Patent: May 7, 1991

[54] FILTERING HIGH ORDER MODES OF SHORT WAVELENGTH SIGNALS PROPAGATING IN LONG WAVELENGTH SINGLE MODE FIBERS

[75] Inventor: Lucjan Sniadower, Paris, France

[73] Assignee: Raynet Corporation, Menlo Park, Calif.

[21] Appl. No.: 455,641

[22] Filed: Dec. 22, 1989

[51] Int. Cl.⁵ .................................................. G02B 6/28
[52] U.S. Cl. ....................................... 350/96.16; 370/3
[58] Field of Search ................ 350/96.15, 96.16, 96.29, 350/96.30, 96.33; 370/3, 4; 455/610, 612, 606, 607, 617

[56] References Cited

U.S. PATENT DOCUMENTS 4,889,404 12/1989 Bhagavatula et al. ............ 350/96.16

Primary Examiner—Frank Gonzalez
Attorney, Agent, or Firm—Dennis E. Kovach

[57] ABSTRACT

An optical fiber network includes a single mode silica core/cladding optical fiber having a cutoff wavelength in the range of about 1000-1200 nanometers, and a plurality of optical couplers serially disposed on the optical fiber so as to form a bus network, with each optical coupler injecting its own unique optical signal into the optical fiber so as to be multiplexed in time, each optical signal injected having a dominant light intensity wavelength below the cutoff wavelength of the optical fiber. Each injected signal propagates initially via a plurality of modes. According to the invention the optical couplers are designed or other means are provided for preferentially attenuating all modes in each optical signal above that of the fundamental modes such that an optical receiver at an end of the optical fiber is capable of detecting signals at a data rate so as to result in a bandwidth far in excess of the multimode bandwidth normally associated with such a fiber at the dominant wavelength of the light emitters. An additional advantage is that an intensity of the fundamental mode is enhanced by mode shifting of optical power from the higher order modes of each optical signal initially supported by the optical fiber.

11 Claims, 3 Drawing Sheets

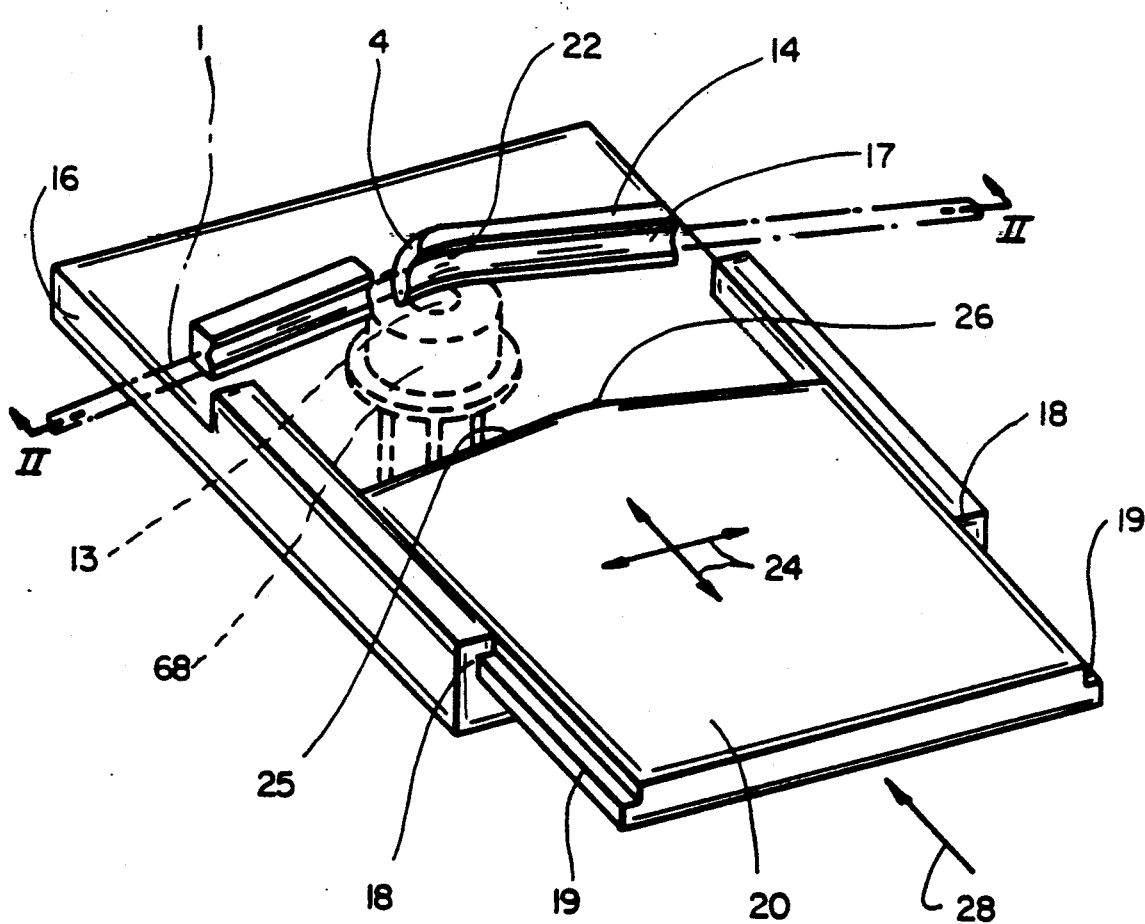
FIG_1
(PRIOR ART)

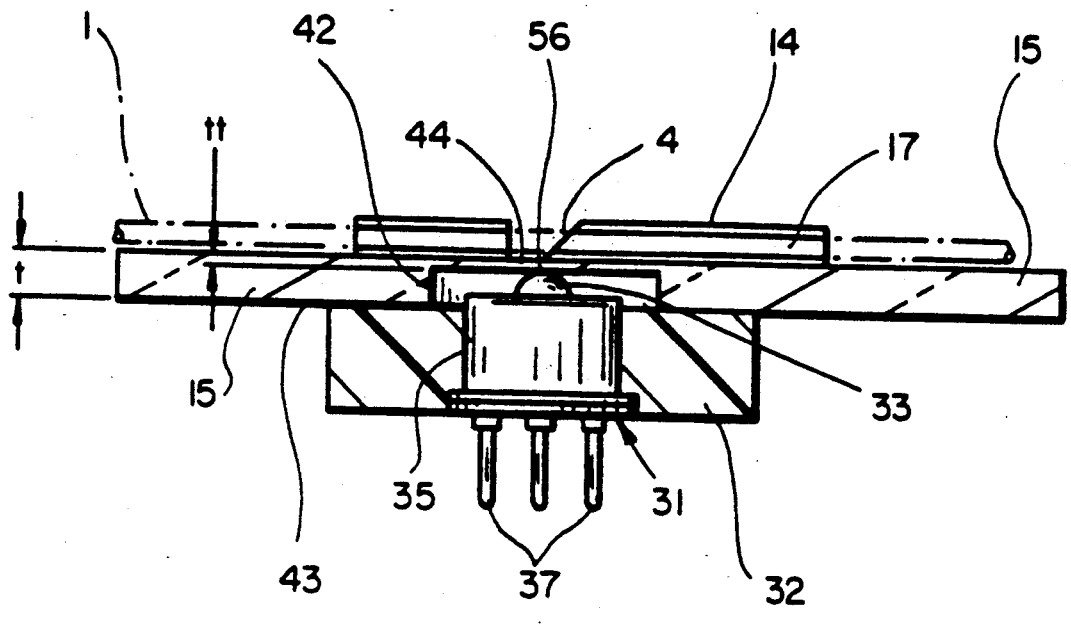
FIG_2
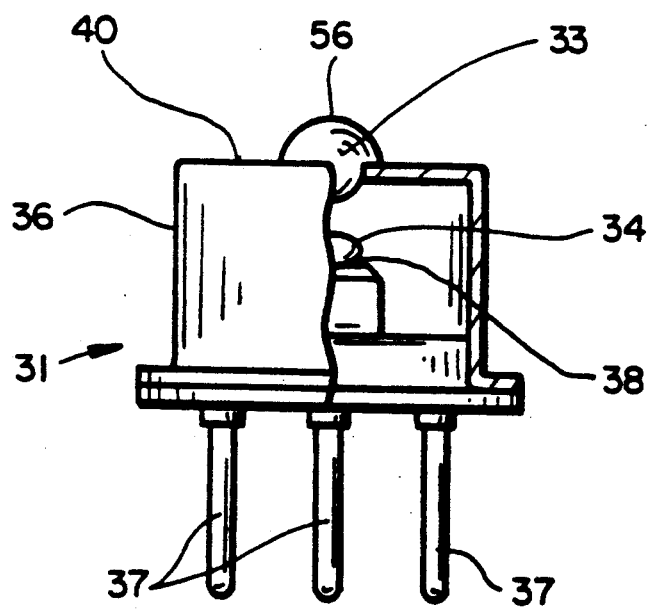
FIG_3
(PRIOR ART)

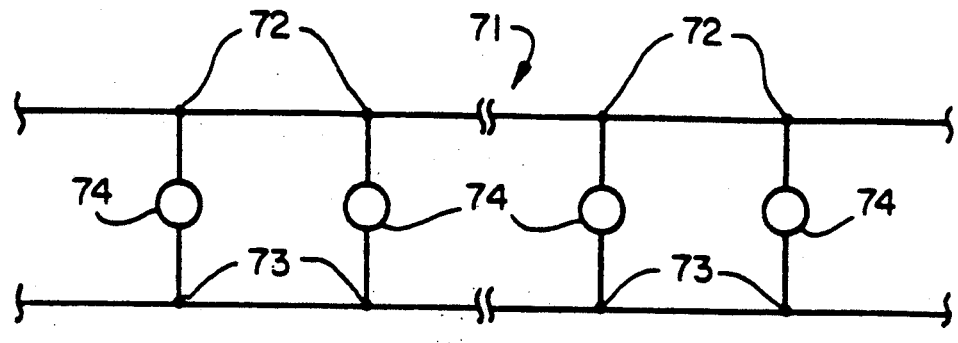
FIG_4
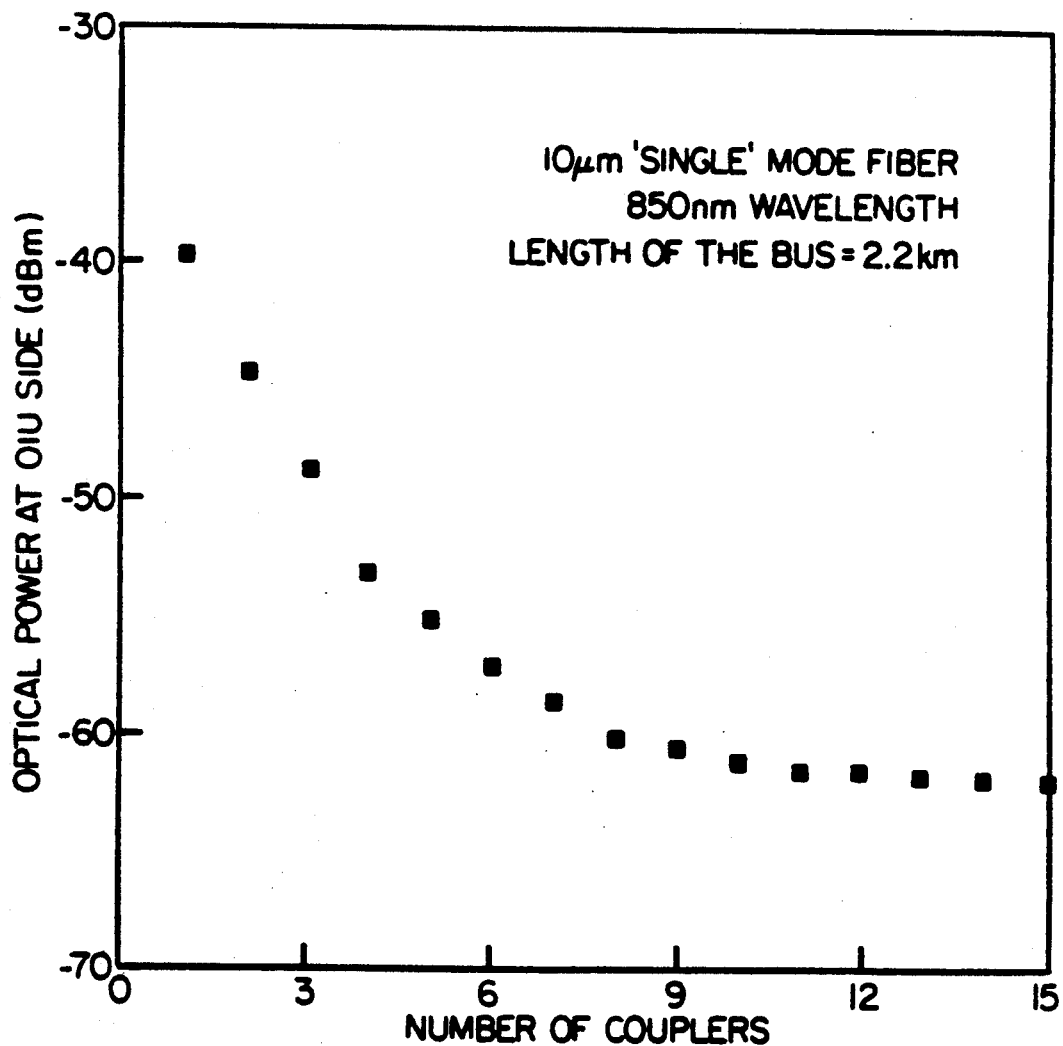
FIG_5

FILTERING HIGH ORDER MODES OF SHORT WAVELENGTH SIGNALS PROPAGATING IN LONG WAVELENGTH SINGLE MODE FIBERS

CROSS-REFERENCE TO RELATED APPLICATION the present application is related to copending application entitled "Compact Optical Fiber Coupler" invented by Sniadower et al., the disclosure of which is incorporated herein by reference.

1. Field of the Invention

The present invention relates to an optical fiber network for transmitting any one or more fo data, voice and video signals, which network uses an optical fiber which is monomode at long wavelength, e.g. 1300 nm, and light emitters which inject short wavelength, e.g. 850 nm, signals therein.

2. Background of the Invention

Numerous proposals have been made in the prior art for constructing data, voice, and video transmission networks which utilize optical fiber as opposed to electrical conduction media in view of the increased bandwidth potential of optical fiber, its lighter weight and smaller size, and its electromagnetic immunity. Nevertheless, a continuum obstacle to the use of optical fiber networks is the increased cost generally associated with such networks as opposed to comparable networks which utilize twisted wire pairs or coaxial cable.

Campbell et al. U.S. Pat. No. 4,768,854, the disclosure of which is hereby incorporated by reference, discloses an advantageous optical fiber network whereby optical signals are multiplexed in time and separately injected into an optical fiber in a serial manner by passing the signals through a side of an optical fiber at bends. The taps disclosed by Campbell et al. are capable of injecting signals into multimode fiber, and such networks are advantageous since a nonlinear attenuation phenomenon to preexisting signals in the optical fiber exists which allows numerous taps to be diposed in the network with a given optical flux budget. However, in the case of optical fiber which is monomode at 1300 nm, the nonlinear attenuation phenomenon does not apply due to the presence of only a single mode in the monomode fiber.

Other proposals have been made in the prior art for disposing one or more taps or optical couplers on monomode fiber, however, such systems all result in an attenuation to a preexisting signal in the optical fiber being identical at all coupler locations along a monomode bus due to the similar effect at each coupler on the signal mode in the signal.

SUMMARY OF THE INVENTION WITH OBJECTS

It is an object of the present invention to provide a monomode optical fiber network which includes a plurality of optical couplers which attenuate a preexisting signal in the monomode optical fiber in a nonlinear manner and hence allows an increased number of optical couplers to be disposed in a network for a given flux budget.

It is a further object of the invention to provide a high bandwidth network which utilizes low cost LEDs housed in simple packages and which couple to a fiber in a stable manner, and which utilizes low cost silicone detectors.

This and other objects of the invention are achieved by an optical fiber network, comprising:
 a single mode optical fiber having a cutoff wavelength above 900 nanometers such that the optical fiber has single mode waveguiding characteristics for propagating light at wavelengths above the cutoff wavelength and multimode waveguiding characteristics for propagating light at wavelengths below the cutoff length;
 means for separately generating N optical signals each having a dominant light intensity at a light wavelength below the cutoff wavelength, N being an integer greater than 1;
 means for separately injecting the N optical signals into the optical fiber at N separate locations serially located on the optical fiber so as to be capable of multiplexing the N optical signals into the optical fiber that the signals initially propagating in the fiber have a plurality of modes.

These and other objects of the invention will be further evident by reference to the following drawings and detailed description.

BRIEF DESCRIPTION OF THE DRAWINGS

FIG. 1 illustrates a prior art optical coupler for injecting light into an optical fiber;

FIG. 2 illustrate a view similar to that of FIG. 1 taken along a curved path defined by the bent optical fiber along lines II—II in FIG. 1, with substrate 16 of FIG. 2 being modified for enhancing light injection into an optical fiber which is monomode at long wavelength;

FIG. 3 illustrate a partial cutaway view of a preferred prior art light source for use in injecting light into a bent optical fiber according to FIG. 2;

FIG. 4 illustrates a preferred network embodiment of the invention; and

FIG. 5 illustrate an intensity of a preexisting optical signal in an optical fiber as a function of a number of couplers disposed downstream therefrom.

DETAILED DESCRIPTION OF THE PREFERRED EMBODIMENT

The present invention is directed to the use of distributed optical fiber networks which include the use of optical fiber which is monomode or single mode at long wavelength, e.g. 1300 and 1500 nm. Optical fiber is generally classifiable into two categories, multimode and "single mode", the latter category also being synonymously referred to as "monomode". Multimode optical fiber has the characteristic that optical signals are supported and propagated therein in a plurality of modes e.g. solutions for electromagnetic equations yield a "fundamental" or first order component, a second order component, a third order component, etc. which are supported by the optical fiber waveguide. These various components are referred to as various light modes in the fiber, and a disadvantageous characteristic of the different light modes in the optical fiber is that they propagate at different velocities. Hence, if a receiver is disposed at an end of the fiber, the signals are dispersed in time which creates noise at the receiver and limits a speed at which the signals can be reliably detected and hence limits the network bandwith. However, in the case of monomode or single mode fiber, only the fundamental portion of the solution of the electromagnetic equations is supported by the optical fiber and hence each signal is represented by only a single mode; hence the terminology monomode or single mode is used to describe such fiber. Receivers in such networks generate much less noise and hence can detect signals at a faster rate which creates higher network bandwith.

Strictly speaking, even the fundamental optical solution consists of multiple components, e.g. typically two in the case of a cylindrical fiber, which solutions are 90° out of phase, though this characteristic is not terribly significant since each phase has a propagation speed which is only very slightly different than that of the other phase and hence creates minimal signal distortion and hence receiver noise, especially when one considers other limitations applicable to other components used in practical systems. Hence, optical fiber which supports only a fundamental (mode) portion of the optical solution is referred to as monomode and single mode fiber even though technically speaking the single mode may actually have more than one component.

Generally speaking, commercially available cylindrical single mode fiber has a core diameter of anywhere from 5-12 microns, typically 8-10 microns, and when a fiber having such a core size is used with optical sources which general optical signals having a dominant light intensity in the range of 1200-1600 nanometers, the second order optical solutions are not capable of being supported by the core due to a small difference between an index of refraction of a cladding of the fiber and its core. Accordingly, only the fundamental mode or first solution is supported by the fiber core, and hence the fiber is characterized as monomode fiber at these wavelengths. As the wavelength of the light source is reduced, at some point the second order optical solution is supported by the optical fiber, and the particular wavelength where this occurs is generally referred to as the optical fiber's "cutoff wavelength". Accordingly, when the fiber is utilized with optical sources which generate dominant light intensities above the cutoff wavelength, the fiber is purely single mode; whereas when it is used with light sources which create dominant light intensity wavelengths which are less than the cutoff wavelength, then the single mode fiber actually supports more modes than simply the fundamental modes and hence is multimode in nature.

Commercially available "multimode" fiber on the hand generally has a core which is much larger than that of single mode fiber, multimode fiber generally have a core diameter of the order of 25-500 microns. In the case of a fiber having a 10's micron diameter core, generally speaking on the order of 10's-100's modes are supported by the fiber, and a vast difference in propagation velocities exists between the mode and hence very significant signal dispersion occurs at the receiver which significantly reduces the bandwidth of such fiber, as compared to that available for single mode fiber.

The present invention is applicable to the use of fiber which is single mode at long wavelengths, e.g. about 1100 nm. Though optical fiber can have a glas or plastic core and cladding, the most preferred embodiments of the invention utilize an optical fiber which has a cylindrical glass core surrounded by a cylindrical glass cladding, with the preferred glass material being silica $SiO_2$. Such fiber is generally protected with one or more polymeric layers generally referred to as a buffer, the buffer generally having an index of refraction at least equal to and preferably higher than that of the cladding so as to strip cladding modes from the fiber so as to preserve the fiber bandwidth.

Generally speaking, no optical source exists which can generate a truly monochromatic optical signal, the best monochromatic beams generated having a line width between $10^8$–$10^9$ Hertz, though a line width of $10^3$–$10^4$ Hertz is more typical for lasers and diodes used in optical telecomunications systems. Nevertheless, most optical sources used in optical fiber telecommunication systems have a relatively narrow line width such that their output frequency or wavelength is generally characterizable by a single figure, e.g. 820 nm, 850 nm, 1300 nm, 1500 nm, etc., and though other wavelengths will also be generated by such light sources by far the light intensity wavelength which is most dominant will be that of the specified wavelength ± a relatively small amount, e.g. at most a few nanometers.

One aspect of the invention is the discovery of methods for injecting optical signals into a normally considered single mode optical fiber using light sources whose dominant light intensity has a wavelength below that of the fiber cutoff wavelength such that a non-single mode optical signal is propagated by the optical fiber with the result that an attenuation to a preexisting signal in the optical fiber which has been previously similarly injected and is propagating in the fiber is nonlinear from optical coupler to optical coupler. The specific nonlinearity discovery is that the attenuation to the preexisting signal progressively decreases with each optical coupler such that at some point the attenuation to the preexisting signal is to a practical extent negligible as a function of the number of optical couplers such that numerous optical couplers can be disposed on the optical fiber and yet stay within a given fixed optical flux budget applicable for the preexisting signal, and all other signals injected into the fiber using the various optical couplers.

The optical coupler which has been discovered to create this surprising and unexpected result has some characteristics similar to those disclosed by Campbell et al, U.S. Pat. No. 4,768,854 in that the optical coupler injects the optical signal into a side of an optical fiber at a fiber bend by utilizing a coupling material disposed in contact with an outer surface of the fiber, with the signal being injected through any polymeric buffer layers which may be left on the fiber (which is one of the preferred embodiments) and also through a cladding of the fiber such that the signals is supported by the optical fiber core. A particularly preferred optical coupler or tap useable with the invention is disclosed by Uken U.S. Pat. No. 4,741,585 and U.S. patent application being filed concurrently herewith entitled "Compact Optical Fiber Coupler" by Sniadower et al., the disclosures of which are hereby incorporated by reference.

Specifically, referring to FIG. 1, one embodiment of a preferred coupler for use according to the invention includes a substrate 16 which has thereon a fiber guiding channel 17 formed in a fiber guide 14. The substrate 16 has a relatively uniform thickness t across most of its area excluding areas immediately adjacent the fiber guide 14 and member guiding channels 18, and the channel 17 extends upward from the substrate 16. The optical fiber is bent about a radius of curvature sufficiently small and about an appropriate bend sector angle such that light can be coupled into a core of the fiber through a cladding of the fiber and optimally through one or more polymeric buffer layers of the fiber. Preferred bend radii are between 1 mm and 25 mm, optimally between 2 mm and 15 mm, preferably less than 10 mm, more preferably less than 5 mm, e.g. 3.86 mm; and a preferred sector angle of the bend is less than 90°, optimally about 30°. Light to be coupled from source 68 is deflected off of surface 4 along a direction substantially parallel to a plane defined by arrows 24 and toward the bent fiber core, the optical fiber being maintained in a bent attitude against channel 17 by being resiliently urged along a direction of arrow 28 by a suitable member 20 which is slideable due to engagement of first and second guiding rails 19 thereof which slide within first and second guiding channels 18 in the substrate 16. The end face 25 of the member 20 has a curved profile portion 26 which optimally conforms to a curved profile of the bent portion 22 of the channel 17 for bending the fiber 1, shown in phantom.

FIG. 2 illustrates an alternative optical coupler for use with the invention which includes a substrate 15 which is substantially similar to the substrate 16 except that the substrate 15 includes a cavity 42 which extends from a side 43 of the substrate 15 which lies in a plane which is substantially parallel to the arrow defining plane 24 and is remote therefrom. The cavity extends in a direction substantially perpendicular to the arrow defining plane 24 and preferably is separated slightly therefrom by a substrate window 44. The FIG. 2 cross-sectional view is taken along a direction of curved line II—II. It should be noted that the V-groove which forms the surface 4 can extend into the substrate 15 and can even extend all the way through the window 44. Alternatively, a depth of the cavity can be such that a thickness of the window can be reduced to zero in a vicinity of a apex or a bottom of the groove 4. A second substrate 32 has a channel 35 therein which can house a light element such as a light emitter 31. Preferably, the light emitter 31 is secured to the substrate 32 such that a surface 56 which emits the light is in contact with the substrate window 44 though the surface 56 can be slightly separated from the window 44. According to this embodiment, a minimum light propagation distance can be designed to exist along the direction substantially perpendicular to the arrow defining plane 24 which minimizes coupling losses due to light drift and results in a very compact coupler design. The cavity 42 can be machined in the substrate 15 or it can be formed in a molding process which can be used to initially produce the substrate 15.

FIG. 3 illustrates a partial cutaway perspective view of a preferred light emitter 31, the light emitter comprising a light emitting diode (LED). The LED 31 includes a light emitting junction 38 which emits light and is focused by a second spherical lens 34 disposed in contact with the light emitting junction 38 and all contained within environmentally sealed package 36 having a ring shaped upper surface 40. A first spherical lens 33 is integrally connected within a center of the ring 40 for accomplishing further light focusing. Both lenses 33, 34 have a converging light beam output and a relatively short focal length. The package 36 further includes electrical positive, negative, and grounds pins 37 on a lower side thereof. A preferred LED for use with the invention is Fujitsu model FED086K1WD which has a typical optical power output of about 4 milliwatts, this LED having a peak wavelength output of about 865 nm. For 1300 nm transmission, Fujitsu model FED 130K1000 is preferred.

Preferably, a thickness tt of the substrate window 44 is substantially less than a thickness t of a substantial portion of the substrate 15, in particular a thickness t of the substrate in areas adjacent to but surrounding the cavity 42. In this case the substrate window thickness tt is defined to be the substrate thickness t minus the cavity depth. In particular, a preferred thickness tt is optimally designed taking into consideration the light focusing characteristics of a light guiding path between the optical fiber portion and a light sensitive junction of the light element. The thickness of the window can be less than half that of t, possibly less than one-fourth, one-fifth, and one-tenth that of t, and in extreme cases the window thickness can be made essentially zero in a vicinity of a part thereof immediately below a bottom portion of the light deflector 4 in which case the "window" actually extends into the guide 14. However, removing too much of the light deflecting surface 4 can result in decreased light coupling between the light element and the optical fiber bent portion.

When a single mode fiber which normally has a cut-off wavelength of between 870 nanometers and 1250 nanometers, preferably between 900–1200 nanometers, more preferably between 1050–1150 nanometers, e.g. about 1100 nanometers, is disposed in any one of the optical couplers thus far described, and a light emitter such as an LED is utilized which has a dominant light intensity at a light wavelength below the cutoff wavelength, in particular a dominant wavelength of about between 800–900 nanometers, preferably between 840–870 nanometers, optimally 865 nanometers, the resulting optical signal into the optical fiber includes the fundamental mode and at least one second order mode. If an optical fiber network is constructed as illustrated in FIG. 4 whereby a plurality of the optical couplers are disposed in series such that each optical coupler injects its own unique optical signal into the optical fiber, an intensity of a first optical signal injected by a first one of the optical couplers is sequentially attenuated by each subsequent optical coupler.

However, it has surprisingly and unexpectedly been discovered that due to preferential mode coupling between the fundamental and second order mode that occurs as a result of the bend in the optical fiber at each of the subsequent optical couplers, an attenuation to a total signal level of the first optical signal by each optical coupler is extremely nonuniform such that after a plurality of the subsequent optical couplers an attenuation to the first optical signal becomes extremely minimal. In effect, an advantageous result of the invention is that a bend radius and sector angle for each optical coupler can be designed whereby it is relatively easy and efficient to couple a short wavelength multimode optical signal into what is a long wavelength single mode optical fiber, with subsequent downstream couplers attenuating the signal but at the same time mixing the optical power between the fundamental and higher order modes such that the fundamental mode is reinforced. The net result of this reinforcement is that overall the fundamental mode is attenuated to a lesser extent than would otherwise exist if the original optical signal were injected in such a manner so that only the fundamental mode was supported by the optical fiber. Accordingly extra optical power results at a network detector.

Furthermore, bend radii and sector angles can be chosen for any downstream optical coupler such that a mulitimode optical signal can be injected by that coupler whose second order modes and any higher modes have a combined totlal intensity which is quite significant relative to an intensity of the fundamental mode.

The reciprocal effect of such a bend profile is that the fundamental of the preexisting signal is minimally affected, and though the higher order modes in the preexisting signal are adversely affected and attenuated at the same time some optical power from these higher order modes is shifted to the fundamental mode. Hence, after a plurality of these downstream couplers the new and extremely advantageous effect is obtained that a receiver at an end of the fiber is able to detect the fundamental mode of the original preexisting signal along with a minimum of noise as a result of higher mode detection. Suffice to say, each downstream optical coupler, the optical signal injected thereby can be considered the "preexisting signal" referred to above so long as sufficient optical couplers are located downstream therefrom so as to advantageously shift optical power from higher order modes into the fundamental mode while inducing minimum attenuation to the fundamental mode with the end result being that the fundamental mode ends up having an intensity significantly greater than that of all the higher order modes combined. This allows a receiver to detect the fundamental mode with a minimum amount of interference noise from the higher order mode so as to preserve single mode bandwidth. The means for creating the amount of sufficient mode coupling and higher order mode attenuation to achieve this result can be the provision of "dummy" optical taps or couplers downstream of the last "real" optical coupler which is injecting a useable optical signal into the optical fiber, or alternatively it can be a series of circular bends having a bend radius and sector angle sufficient to achieve the desired amount of mode coupline downward from the higher order modes into the fundamental modes and preferential higher order mode attenuation.

A preferred embodiment of a fiber network according to the invention is illustrated in FIG. 4. In this figure, a network 71 includes a plurality of write and read couplers, 72, 73 in series illustrated in FIGS. 2 and 1 respectively. Information is written form terminals 74 onto a bus fiber using the write couplers and is read from a fiber bus by the terminals 74 using the read couplers.

EXAMPLE

An optical fiber bus utilized an SMF 21 single mode optical fiber commercially available from Corning Glassworks, the fiber having a silica core surrounded by a silica cladding, the core having a diameter of approximately 10 microns. The bus had 16 optical couplers constructed as illustrated in FIG. 2 with an LED commercially available from Fujitsu model SED086K1WD. A bend radius and sector angle generated in the fiber by each optical coupler was 3.86 mm and 30° respectively. Each of the LEDS had a dominant output wavelength of 865 nanometers, and a length of the fiber bus was 2.2 km. The first or most upstream located optical coupler is considered to be the optical coupler which injects the "preexisting optical signal" into the optical fiber, and a level of this signal at an end of the bus was monitored with a receiver while subsequently attaching sequential taps downstream from the original optical coupler such that the first optical coupler located closet to the original optical coupler is denominated as optical coupler number "1", the next optical coupler located in the next sequential position downstream on the bus is denoted number "2", etc. Adjacent optical couplers were separated by at least ½ meter so as to allow mode mixing to occur between couplers. Table 1 designates the optical power for the preexisting signal as each sequential optical coupler was added to the bus, and also indicates an attenuation to the preexisting signal created by each sequential addition of an optical coupler, and the intensity of the preexisting signal is further shown in graph form in FIG. 5. As Table 1 and FIG. 5 clearly illustrate, after about 8 optical couplers the amount of attenuation to the preexisting optical signal becomes negligible.

TABLE 1

| # of Couplers | Optical Power (dB) | Attenuation (dB) |
| --- | --- | --- |
| 1 | −39.4 | 0 |
| 2 | −44.4 | 5.0 |
| 3 | −48.6 | 9.2 |
| 4 | −53.0 | 13.6 |
| 5 | −55.0 | 15.6 |
| 6 | −57.0 | 17.6 |
| 7 | −58.5 | 19.1 |
| 8 | −60.1 | 20.7 |
| 9 | −60.5 | 21.1 |
| 10 | −61.0 | 21.6 |
| 11 | −61.4 | 22.0 |
| 12 | −61.5 | 22.1 |
| 13 | −61.7 | 22.3 |
| 14 | −61.8 | 22.4 |
| 15 | −61.9 | 22.5 |

Preferably silicone detectors are preferred for detecting signals injected by the couplers.

Though the invention has been described by reference to certain preferred embodiments thereof, the invention is not to be so limited and is only to be limited by the appended claims.

We claim:

1. An optical fiber network, comprising:
    a single mode optical fiber having a cutoff wavelength above about 900 nanometers such that the optical fiber has single mode waveguiding characteristics for propagating light at wavelengths above the cutoff wavelength and multimode waveguiding characteristics for propagating light at wavelengths below the cutoff wavelength;
    means for separately generating N optical signals each having a dominant light intensity at a light wavelength below the cutoff wavelength, N being an integer greater than 1;
    means for separately injecting the N optical signals into the optical fiber at N separate locations serially located on the optical fiber so as to be capable of multiplexing the N optical signals into the optical fiber, and
    means for detecting and discriminating a fundamental mode from other modes of at least one of the N optical signals when detecting the fundamental mode of the at least one optical signal at a location downstream from all of the N injecting means.

2. The network of claim 1, the detecting and discriminating means detecting only a fundamental mode of each of the N optical signals in the optical fiber at a location downstream from the N injecting means.

3. The network of claim 2, N being greater than 8.

4. The network of claim 2, the discriminating and detecting means including at least one bend in the optical fiber downstream from a last one of the N injecting means, the one bend having a bend radius and sector angle sufficient to significantly preferentially attenuate all non-fundamental modes rather than the fundamental modes of an optical signal injected into the optical fiber by the last one of the N injecting means.

5. The network of claim 4, the bend radius being between 2 and 15 mm and the sector angle being less than 90°.

6. An optical fiber network, comprising:
   a single mode optical fiber having a cutoff wavelength above about 900 nanometers such that the optical fiber has single mode waveguiding characteristics for propagating light at wavelengths above the cutoff wavelength and multimode waveguiding characteristic for propagating light at wavelengths below the cutoff wavelength;
   means for separately generating N optical signals each having a dominant light intensity at a light wavelength below the cutoff wavelength, N being an integer greater than 1;
   means for separately injecting the N optical signals into the optical fiber at N separate locations serially located on the optical fiber so as to be capable of multiplexing the N optical signals into the optical fiber;
   each injecting means creating a bend in the optical fiber about a bend radius and sector angle which allows an optical signal to be injected into a core of the optical fiber through a side of the fiber.

7. The network of claim 6, the bend radius being between 2 and 15 mm, the sector angle being less than 90°.

8. The network of claim 7, each injecting means injecting its respective optical signal into the optical fiber core by passing the signal through an optical coupling medium, an optical fiber buffer, an optical fiber cladding, the cladding and core being made essentially of silica and being substantially cylindrical in shape.

9. An optical fiber network, comprising:
   a single mode optical fiber having a cutoff wavelength above about 900 nanometers such that the optical fiber has single mode waveguiding characteristics for propagating light at wavelengths above the cutoff wavelength and multimode waveguiding characteristics for propagating light at wavelengths below the cutoff wavelength;
   means for separately generating N optical signals each having a dominant light intesity at a light wavelength below the cutoff wavelength, N being an integer greater than 1;
   means for separately injecting the N optical signals into the optical fiber at N separate locations serially located on the optical fiber so as to be capable of multiplexing the N optical signals into the optical fiber;
   then optical signals being mulitiplexed in time.

10. An optical fiber network, comprising:
    a single mode optical fiber having a cutoff wavelength above about 900 nanometers such that the optical fiber has single mode waveguiding characteristics for propagating light at wavelengths above the cutoff wavelength an multimode waveguiding characterstics for propagating light at wavelengths below the cutoff wavelength;
    means for separately generation N optical signals each having a dominant light intensity at a light wavelength below the cutoff wavelength, N being a integer greater than 1;
    means for separately injecting the N optical signals into the optical fiber at N separate locations serially located on the optical fiber so as to be capable of meltiplexing the N optical signals into the optical fiber;
    the dominant light intensity of each of the N optical signals initially injected being between 800 and 880 nanometers.

11. The network of claim 10, the dominant light intensity of each of the N optical signals initially injected being between 840 and 870 nanometers.

* * * * *